(12) United States Patent
Ambale Srinivasamurthy et al.

(10) Patent No.: US 10,831,589 B2
(45) Date of Patent: Nov. 10, 2020

(54) SERVICE PORTAL DIAGNOSIS SYSTEM PROVIDING ISSUE RESOLUTION STEPS

(71) Applicant: ServiceNow, Inc., Santa Clara, CA (US)

(72) Inventors: Padmaprabodh Ambale Srinivasamurthy, Hyderabad (IN); Kushal Kudavale, Hyderabad (IN)

(73) Assignee: ServiceNow, Inc., Santa Clara, CA (US)

(*) Notice: Subject to any disclaimer, the term of this patent is extended or adjusted under 35 U.S.C. 154(b) by 104 days.

(21) Appl. No.: 16/164,053

(22) Filed: Oct. 18, 2018

(65) Prior Publication Data
US 2020/0089555 A1 Mar. 19, 2020

Related U.S. Application Data

(60) Provisional application No. 62/732,399, filed on Sep. 17, 2018.

(51) Int. Cl.
*G06F 11/00* (2006.01)
*G06F 11/07* (2006.01)

(52) U.S. Cl.
CPC .......... *G06F 11/079* (2013.01); *G06F 11/076* (2013.01); *G06F 11/0709* (2013.01); *G06F 11/0793* (2013.01)

(58) Field of Classification Search
CPC .............. G06F 11/079; G06F 11/0793; G06F 11/36–3696; G06F 11/321; G06F 11/323; G06F 11/324; G06F 11/328
See application file for complete search history.

(56) References Cited

U.S. PATENT DOCUMENTS

| 5,793,369 A | * | 8/1998 | Atkins ................ G06F 3/04847 714/E11.181 |
| 6,609,122 B1 | | 8/2003 | Ensor |
| 6,678,887 B1 | | 1/2004 | Hallman |
| 7,020,706 B2 | | 3/2006 | Cates |

(Continued)

OTHER PUBLICATIONS

Voinea et al., "CVSscan: Visualization of Code Evolution", 2005, ACM, pp. 47-56 and 209 (Year: 2005).*

(Continued)

*Primary Examiner* — Michael Maskulinski
(74) *Attorney, Agent, or Firm* — Fletcher Yoder PC

(57) ABSTRACT

The present approach relates to facilitating the diagnosis of one or more performance issues associated with running an application (and widgets in the application) on a client instance hosted by one or more data centers by allowing script comparison, configuration comparison, and so forth, all in one interface, without the need for a user to navigate between various windows and/or interfaces. In accordance with the present approach, one or more performance issues are determined based on a first set of data indicative of an initial version of the application and a second set of data indicative of a customized version of the application. After determining the one or more performance issues, a visualization of diagnosis data associated with one or more widgets may be generated in response to executing the customized application to categorize the one or more widgets based on a severity of the one or more performance issues.

20 Claims, 11 Drawing Sheets

(56) References Cited

U.S. PATENT DOCUMENTS

| | | |
|---|---|---|
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,546,543 B2 * | 6/2009 | Louch ................ G06F 8/38 715/762 |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,539,598 B2 | 9/2013 | Maheshwari et al. |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,767,083 B2 | 9/2017 | Fei et al. |
| 9,792,387 B2 | 10/2017 | George |
| 9,805,322 B2 | 10/2017 | Kelkar |
| 2010/0027896 A1 * | 2/2010 | Geva ................ G06F 11/3414 382/229 |
| 2016/0266896 A1 * | 9/2016 | Fan ..................... G06F 8/33 |
| 2018/0046562 A1 * | 2/2018 | Yu .................. G06F 11/362 |
| 2019/0179624 A1 * | 6/2019 | Agarwal ............... G06F 9/54 |

OTHER PUBLICATIONS

Ball et al., "Software Visualization in the Large", Apr. 1996, IEEE, pp. 33-43 (Year: 1996).*

Eick et al., "Visualizing Software Changes", Apr. 2002, IEEE Transactions on Software Engineering, vol. 28, No. 4, pp. 396-412 (Year: 2002).*

* cited by examiner

| | INITIAL VERSION (256) | SUBSEQUENT CURRENT VERSION (156) |
|---|---|---|
| ACTION | INSERT_OR_UPDATE | INSERT_OR_UPDATE |
| ACTION | ☑ | ☑ |
| BOOTSTRAP CLASS NAME | | |
| BOOTSTRAP COLOR | DEFAULT | DEFAULT |
| CSS | | |
| GLYPH | | |
| ID | | |
| ORDER | 0 | 0 |
| ROLES | | ✎ |
| SHORT DESCRIPTION | | |
| BOOTSTRAP SIZE | MEDIUM | MEDIUM |
| COLUMN | 1 | 1 |
| WIDGET | KNOWLEDGE FEATURED ARTICLES | KNOWLEDGE FEATURED ARTICLES |
| PROTECTION POLICY | -NONE- | -NONE- |
| TITLE | FEATURED | FEATURED |
| HREF / URL | | |
| ADDITIONAL OPTIONS JSON FORMAT | { "table":{ "value":"kb_knowledge", | { "table":{ "value":"kb_knowledge", |

Top: ◁ COMPARE TO [sp_instance]FEATURE — REVERT TO SELECTED VERSION (250) — SAVE MERGE (252)

Bottom: REVERT TO SELECTED VERSION (264) — SAVE MERGE (262)

```
COMPARE VERSIONS
                INITIAL VERSION OF WIDGET              SUBSEQUENT VERSION OF WIDGET
20   c.articles_perpage = c.options.articles_per_page;    20   c.articles_perpage = c.options.articles_per_page;
21   c.loadOffset = c.options.scroll_article_count;        21   c.loadOffset = c.options.scroll_article_count;
22   c.ts_queryId = "";                                    22   c.ts_queryId = "";
23                                                         23
24   c.paginationInfo = {                                  24   c.paginationInfo = {
25     totalCount: 0,                                      25     totalCount: 0,
26     pageSize: c.articles_perpage,                       26     pageSize: c.articles,
27     noOfLinks: c.options.no_of_links_in_pagination      27     noOfLinks: c.options.no_of_links_in_pagination
28                                                         28
29                                                         29
30                                                         30
31                                                         31
32                                                         32
33                                                         33
34                                                         34
35                                                         35
36                                                         36
37                                                         37
38                                                         38
                                                                                            CANCEL  OK
```

SERVICE PORTAL DIAGNOSIS SYSTEM PROVIDING ISSUE RESOLUTION STEPS

CROSS-REFERENCE TO RELATED APPLICATIONS

This application claims priority to U.S. Provisional Application No. 62/732,399, entitled "SERVICE PORTAL DIAGNOSIS SYSTEM FOR PROVIDING A VISUAL INDICATION OF A DIAGNOSIS," filed Sep. 17, 2018, the disclosure of which is herein incorporated by reference in its entirety for all purposes.

BACKGROUND

The present disclosure relates generally to generating a service portal diagnosis system for providing a visual indication of a diagnosis.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Enterprises and other organizations may develop various applications licensed or sold to other entities and which may be implemented on various types of computational instances. The implementation of the applications to perform a given operation may be realized via the implementation of script (e.g., computer code). In some instances, the script configured to run on a given instance may be customizable, such that an initial version of an application provided or sold to the entity using the application may be customized to include additional or alternative sets of instructions specific to that entity, such as instructions for addressing issues or contexts specific to that entity. In this manner, an entity may customize aspects of the initial version of the application (e.g., the "out-of-the-box" version) to specifically cater to diverse and/or specific needs of the entity. For example, a given application script may be modified to include specific branding or interface themes, selectable widgets, and the like, altering the initial version of the application to meet the needs or purposes of the organization or entity using the application.

However, customizing the initial version of the application by modifying the associated script, which may be done incorrectly by the client, may accidentally or inadvertently break the application (e.g., the application may run suboptimally or not execute instructions as intended). In such an event, a service request may be submitted to service agents (or other suitable personnel) to remedy the issue. Typically, a service agent assigned to remedy the issue may be required to examine the modified script, sometimes exceeding hundreds or even thousands of lines of script, to manually identify aspects of the script that were altered. This tedious task of manually debugging modified script to remedy the issue may require a large amount of time and resource expenditures. However, in view of the diverse organizational needs and practices motivating customization of such scripts, improving the process of identifying issues in suboptimally operating or broken version of applications, which have been modified from their initial version(s) may be difficult to implement in practice.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approach relates to systems and methods for facilitating the diagnosis of one or more issues associated with running an application (and widgets in the application where applicable) on a client instance hosted by one or more data centers. The systems and methods disclosed herein determine one or more performance issues based on a first set of data indicative of an initial version of the application (e.g., an out-of-the-box (OOTB) version of the application) in relation to a second set of data indicative of a customized version of the application (e.g., a customized version of the OOTB version of the application). In certain implementations, identifying and/or resolving the one or more performance issues may be facilitated by comparing the first set of data to the second set of data to determine the aspects of the initial version of the application that were changed in the customized version of the application. The computer system may then present a visualization of diagnostic data associated with one or more widgets generated in response to executing the customized version of the application. The diagnostic data categorizes the one or more widgets based on a severity of the one or more performance issues (such as using color coding, contours, or other visual indications) to facilitate resolving the one or more performance issues. That is, the visualization may present coded or visually characterized diagnostic data for the one or more widgets in the executed customized version of the application, which may facilitate determining and resolving the issues, as compared to traditional debugging techniques, for example, that may only employ a scripting interface. In this manner, the present approach provides a user a visualization to more easily compare script associated with an initial version of the application to script associated with the customized version of the application, all in one interface, providing the user with a more easy-to-use interface that reduces user clicks and saves the user from jumping through many interfaces and windows to access diagnostic tools.

BRIEF DESCRIPTION OF THE DRAWINGS

Various aspects of this disclosure may be better understood upon reading the following detailed description and upon reference to the drawings in which:

FIG. 9 is a screenshot of an embodiment of a version comparison window comparing an widget in the initial version of the application of FIG. 8 and a widget in a customized version of the application of FIG. 8, in accordance with aspects of the present disclosure;

FIG. 10 is a screenshot of an embodiment of a respective scripting interface for an initial version and a customized version of FIG. 9 of the application of FIG. 8, in accordance with aspects of the present disclosure.

DETAILED DESCRIPTION OF SPECIFIC EMBODIMENTS

Figure 1:
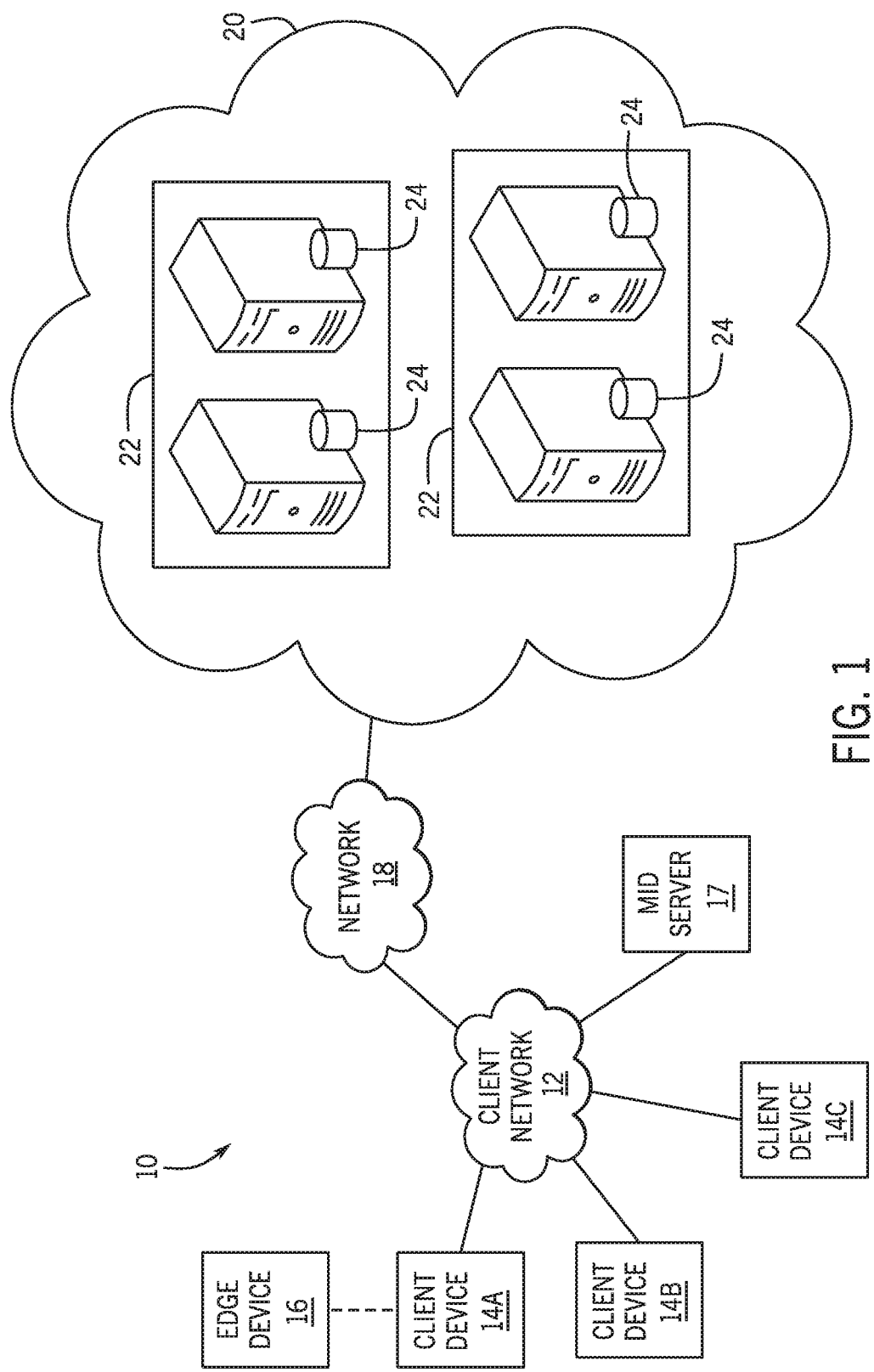
FIG. 1 is a block diagram of an embodiment of a cloud computing system in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. In some embodiments, the computing system may employ any suitable circuitry, such as a processor-based device, memory devices, storage devices, and the like. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "widget" refers to a user interface element of a graphical user interface (GUI) that operate as a small, self-contained application within the GUI. As such, a widget may be associated with instructions that are executed by a processor-based device of the computing system to present data (e.g., a graph, plot, etc.) to the user, and to update the graph based on changes to data underlying the graph. Additionally, certain widgets can be configured by users to provide customized functionality that can be saved for later access and/or transferred to other users.

Furthermore, as used herein, the term "initial versions" of an application may refer to a version of an application (e.g., software modules, software objects, software instances and/or other types of executable code) distributed by a developer, such as an enterprise, a software or application developer, and the like, as part of a sale, licensing arrangement, or other distribution scheme. In some contexts, an initial version of an application as used herein may refer to an out-of-the-box (OOTB) version of the application, which corresponds to a special instance of an initial, prior, or original version of the application as, for example, as distributed for sale or licensing by one or more clients or customers. Additionally or alternatively, the initial versions of an application may correspond to unmodified or uncustomized versions of the application. In other contexts, the initial version of the application may refer to the last functioning version of the application, which in some instances, may corresponding to the earlier version of the application or the product release version of the application. In certain instances, the initial version (e.g., OOTB) of the applications may be customizable by a purchasing or licensing entity to accommodate client-specific constraints and/or enhance performing client-specific operations. The customized version of the application, as discussed herein, may be referred to as a "customized version" of the application.

As discussed herein, in some embodiments, initial versions of applications developed by enterprises or other developers may be licensed or sold to various clients, for example, to be implemented on various client instances employed to run script (e.g., computer code) associated with the applications. As discussed herein, the script may be stored as a set of instructions in one or more mediums, and the set of instructions may be executed by one or more processor-based devices to perform certain operations. The script associated with the initial version of the applications may be customized to include additional or alternative sets of instructions (e.g., script) that differ from the initial version. In this manner, the clients may customize the initial version of the application to specifically cater to their specialized client needs. For example, a client may modify the script associated with an OOTB application to include specific branding themes, additional selectable widgets, and the like, enhancing the OOTB application as applied for purposes related to the client.

However, in some contexts customizing the application to address client needs may inadvertently result in a broken customized (e.g., client-modified) version of the application (e.g., an application that runs suboptimally or does not adequately execute instructions). In the event of a customized application performing poorly (or not at all), the client may submit a service request to service agents (or other suitable personnel at the application-developing enterprise) to remedy the issue associated with the corresponding customized version of the application running on the client instance. Typically, a service agent assigned to remedy the issue may be required to examine the client-modified script, sometimes exceeding hundreds or even thousands of lines of script, to manually identify aspects of the broken customized application that were altered. This tedious task of manually debugging client modified script to remedy the issue may require large time and resources expenditures. Accordingly, it is now appreciated that there is a need to improve identification of issues arising from customizing an application. However, in view of the diverse client needs and practices motivating customization of script, improving the process of identifying issues in customized (e.g., subsequently modified) versions of an application operating suboptimally may be difficult to implement in practice.

With the preceding in mind, aspects of the present approach include systems and methods for generating a service portal diagnosis system for more easily identifying issues associated with customization of an applications, such as a customized application implemented on client instances and operating suboptimally. It should be appreciated that the embodiments described herein may be performed using a computing system accessible to a client or a service agent and employed to execute instructions associated with certain applications, such as initial versions (e.g., OOTB versions) of applications, customized versions of the applications, and the like. Present embodiments may include receiving a first set of data indicative of the initial version of the application and receiving a second set of data indicative of the customized version of the application, and then comparing the first and second set of data to display a visualization of diagnosis data indicative of an issue. The visualization may include content (e.g., color-coded or other visually keyed content) that easier to decipher than the script itself, enabling a service agent to more efficiently diagnose and remedy an issue associated with the customized version of the application. For example, the visualization may categorize various features associated with the application running in the client instance (e.g. as presented to the client), for example, by associating a first color to unchanged widgets relative to the initial version of the application, a second color to new, custom widgets, a third color to customized widgets relative to the initial version of the application, and a fourth color to cloned widgets substantially copied from one of one or more widgets of the initial version of the application.

In this manner, a service agent or a client looking to resolve an issue associated with a customized version of the application and its corresponding features (e.g., widgets) may more easily be able to determine the source or errors or faulty script causing the faulty or broken operation of the widget and/or application. That is, the present approach provides a service agent or client a visualization to more easily compare script associated with an initial version of the application to script associated with the customized version of the application, all in one interface, providing the user with a more easy-to-use interface that reduces user clicks and saves the user from jumping through many interfaces and windows to access diagnostic tools. In some contexts, resolving issues in a faster manner helps clients in faster upgrade cycles (e.g., upgrading from an initial version of an application to a subsequent version of an application), thereby reducing costs.

With the preceding in mind, and by way of context, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a block diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes a bridge device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (which may be referenced herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from certain drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
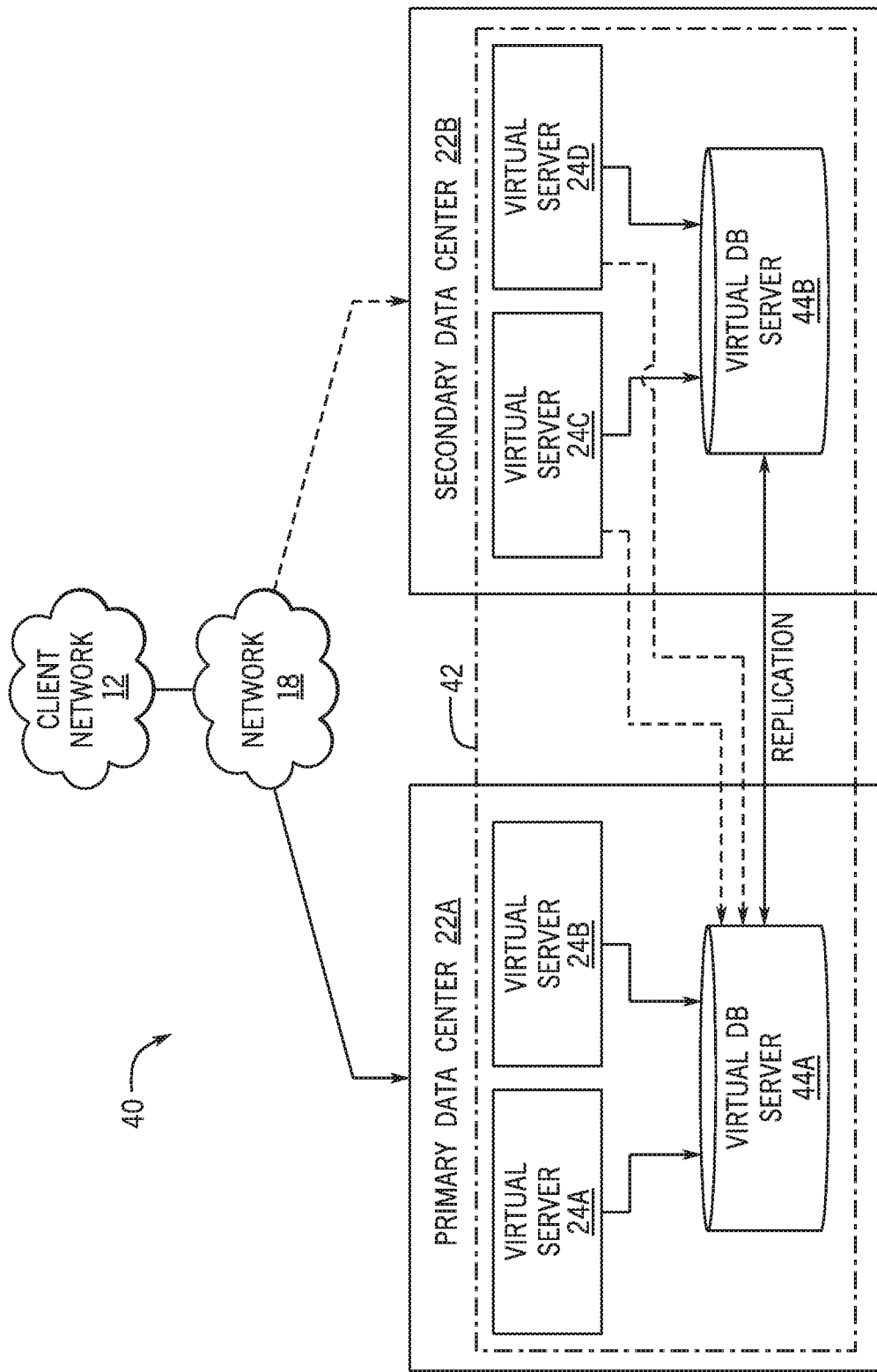
FIG. 2 is a schematic diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For example, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
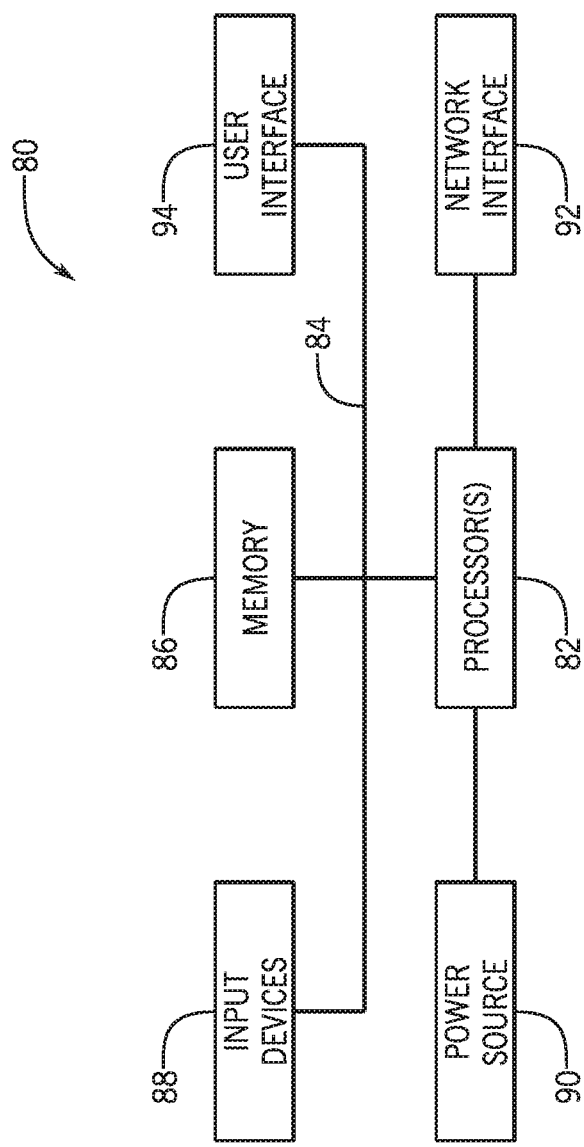
FIG. 3 is a block diagram of an embodiment of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3 and may be present in the embodiments of FIGS. 1 and 2. FIG. 3 generally illustrates a block diagram of example components of a computing system 80 and their potential interconnections or communication paths, such as along one or more busses 84. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein. The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
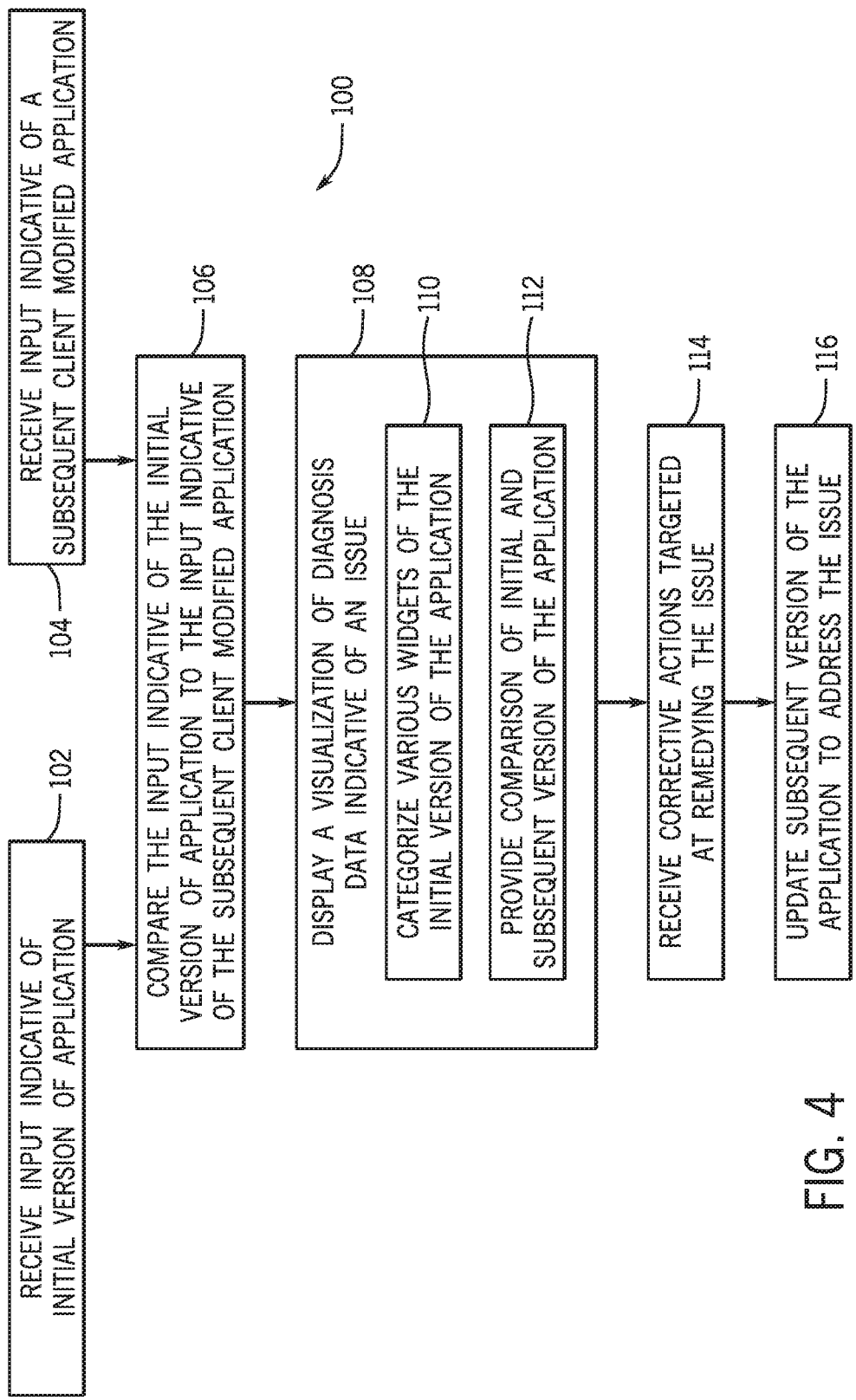
FIG. 4 is a flow diagram of a process for displaying a visualization of diagnosis data indicative of an issue associated with a customized version of an application to facilitate addressing the issue, in accordance with aspects of the present disclosure.

With the preceding in mind, FIG. 4 is a flow diagram 100 of a process for displaying a visualization of diagnosis data indicative of an issue associated with a customized version of an application to facilitate addressing the issue, in accordance with aspects of the present disclosure. The steps illustrated in the flow diagram 100 may be performed by a computing system 10 (e.g., having a processor 82 employed by the client devices 14A-14C) operated by a client (e.g., on a client instance) on the network 18 or a computing system 10 (e.g., processor 82) operated by service agents on the network 18, for example, for the purposes of facilitating debugging and/or resolving of an issue arising from a customized version of an application, which has been modified from an initial or earlier version of an application, such as an OOTB application. Furthermore, the steps illustrated in the flow diagram 100 are meant to facilitate discussion and are not intended to limit the scope of this disclosure, since additional steps may be performed, certain steps may be omitted, and the illustrated steps may be performed in any order.

The flow diagram 100 may include receiving (process block 102) a first input comprising code or script associated with an earlier or initial version of the application and receiving (process block 104) a second input comprising code or script associated with a customized version of the application.

For example, an enterprise may develop and license or sell an initial version (e.g., OOTB version) of the application, which may include pre-installed widgets. The application may enable a client to perform any suitable operation, such as facilitating asset management within a CMDB. The initial version may include script as developed by the enterprise and its developers. In some contexts, the clients running the initial version of the application may wish to modify features included in the initial version of the application, such as one or more of the widgets. The initial version of the application may be customizable, such that the client may modify script associated with the initial version of the application. For example, the client may wish to customize the home page of the script to include the logo, slogan, or other branding aspects specific to the client. To accomplish the desired level of customization, the client may modify the script associated with the initial version of the application to incorporate the desired modifications. The initial version of the application may be modified according to client preferences, via any suitable techniques, such that a subsequent, customized version of the application is created. Indeed, any number of the subsequently customized versions of the application may be created.

In some embodiments, the initial version and the customized version of the application may be saved or backed-up (e.g., to the primary and secondary data centers 22A, 22B). In this manner, the various versions of the application may be accessible (e.g., to service agents and clients) via the network 18. As mentioned above, in some contexts, the initial version of the application may be modified in such a manner that the application or certain widgets within the application stop operating or operate in a suboptimal manner. In response, the client may want to diagnose the customized version of the application to determine the issue or may submit a service request to a service agent who may diagnose and fix the suboptimally operating customized version of the application. Instead of reverting the customized version of the code to the initial version of the code, the client may wish to diagnosis and address issues contributing to the suboptimally operation of the customized version of the code to preserve certain modifications already made to the script.

To facilitate diagnosis, after receiving (process blocks 102, 104) the first input indicative of data associated with the initial version of the application and the second input indicative of data associated with the customized version of the application, the computing system 10 may compare (process block 106) the first and second inputs. In some embodiments, comparing (process block 106) the first input indicative of data associated with the initial version of the application and the second input indicative of data associated with the customized version of the application may include scanning the script associated with initial version and comparing (process block 106) it to the script associated with the customized version of the application, such as in a line-by-line, module-by-module, or function-by-function manner.

For example, the computing system 10 may identify certain contexts of the script of the initial version of the application, such that portions of the script are labeled according to the contexts (e.g., whether the portion of the script is a variable, string, function, etc.). In some embodiments, the contextualized portions of the script for the initial version may be matched to corresponding contextualized portions of the script for the customized version of the application. In this manner, modified portions of the initial script, copied (e.g., cloned) portions of the initial script, or new portions of script not present in the initial script may be identified and associated to the customized application and its widgets as implemented on a client instance. Furthermore, any additional or alternative comparison algorithms, such as those employing clustering, root findings, numerical optimizations, least-square regressions, and/or neural network arrangements useful in facilitating the quantitative and qualitative comparison of data sets may be employed.

After comparing (process block 106) the first and second inputs, the computing system 10 may display (process block 108) a visualization of diagnosis data indicative of an issue. In some embodiments, the visualization may be displayed on a screen associated with the computing system 10 to enable a service agent to more easily identify an issue. Alternatively or additionally, the visualization may be presented on a client instance associated to the customized version of the application. As discussed in detail below, the visualization may categorize (process block 110) the various widgets of customized application into specific diagnostic categories, as the widgets appear on the client instance when the customized application in run. For example, in one implementation the visualization may categorize (process block 110) (such as by color coding or other visual keying) the widgets in the customized version into a first categorization indicative of an unchanged widget as present in the initial version of the application, a second categorization indicative of a new custom widget (i.e., a widget not present in the initial or earlier version of the application), a third categorization indicative of a customized widget relative to the widget in the initial version of the application, or a fourth categorization indicative of a cloned widget substantially copied from one of one or more widgets of the initial version of the application. In one such example, the first categorization may include a green outline around the unchanged widget, the second categorization may include a blue outline around the new custom widget, the third categorization may include a yellow outline around the customized widget relative to the initial version of the application, and the fourth categorization may include a red outline around the cloned widget substantially copied from one of one or more widgets of the initial version of the application. In this manner, a service agent may at a glance identify widgets of interest (e.g., client-modified widgets) without having to read through the entire script of the customized version of the application. While the categorization discussed above includes color designations between the various categorizations, it should be understood that any suitable categorizations (e.g., shading, hatching, symbols or characters, visual effects, and so forth) to visually differentiate the categories may be employed. For example, the visualization may include contours (e.g., shape outlines) around the widgets, and/or, in other contexts, may include highlights, visual effects (e.g., flashing alerts), asterisk, and/or anything noticeable to a service agent.

The computing system 10 may visually provide (process block 112) a comparison of the initial and customized version of the application, in certain embodiments, in response to a user selection to present certain information. In other embodiments, the computing system 10 may provide (process block 112) a comparison of a widget in each of the initial and customized version of the application. For example, in response to user selection of an overview comparison of a widget corresponding to the customized version of the application, the computing system 10 may generate a side-by-side comparison, including various fields of information for the widget as included in the initial application and the widget as included in the customized version of the application, as described in detail below. The fields of information for the widget in the initial version may be on the left, and the same fields for the widget in the customized version may be to the right, but it should be understood that the fields for the widgets in the initial and customized versions may be positioned anywhere on the display relative to each other to enhance legibility. Furthermore, the fields may include a name, Cascading Style Sheets (CSS), the glyph, roles, a short description, the Hypertext REFerence (HREF), Uniform Resource Locator (URL), script associated with the widget in the initial and customized versions of the application, and the like. As described in detail below, these fields may be customizable, such that a service agent may modify the information entered into the respective fields. Furthermore, the side-by-side comparison may more easily enable a service agent to identify which aspects of the initial version of the application were modified to create the customized version.

In some embodiments, providing (process block 112) the comparison of the initial and customized versions of the application may include generating a side-by-side comparison of the script associated with each of the initial and customized versions of the code, based on user inputs. For example, as discussed in detail below, after determining the source of the issue, a service agent may wish to view and customize the script of a widget of the customized version of the application, and selection of the widget may cause the computing system 10 to present the corresponding script of the widget in the initial version next to the script of the widget as included in the customized version. In this manner, the service agent may view and compare the script of the widget in a customized version of an application to the corresponding widget in the latest OOTB version (e.g., the unmodified initial version) of the application, which in this example refers to the initial version of the application, to more easily determine the issue with the customized version and develop plan for taking corrective actions aimed at remedying the issue.

The computing system 10 may receive (process block 114) corrective actions targeted at remedying the issue. For example, using the embodiments disclosed herein, the service agent may identify the new custom widgets (e.g., as identified via the second categorization), the customized widget relative to the initial version of the application (e.g., as identified via the third categorization), or the cloned widgets (e.g., as identified using the fourth categorization), of which one or more of these widgets may be identified as faulty. That is, the service agent may view the categorizations along with the widgets as implemented when the application is running. In this manner, the service agent may save time in diagnosing the problem, as the service agent may exclude from analysis aspects of the customized version of the application that were unchanged from the initial version, for example, when those unchanged aspects of the initial version of the application are functioning properly.

In certain embodiments, receiving (process block 114) corrective actions may include receiving script targeted at resolving the issue or modifications to the fields, as discussed below. In other embodiments, the corrective actions may be realized via modifications to any aspects of the service portal diagnosis system, as discussed in detail below. By using the embodiments disclosed herein, the service agent may more easily be able to provide corrective actions after identifying the issue. Furthermore, while the corrective action discussed above include service agent modified script, it should be understood that any suitable corrective action may be received by the computer system 10. In response to receipt of these corrective actions, the computer system 10 may update (process block 116) the customized version of the application to address the issue. In some embodiments, computing systems 10 may run the updated customized application to ensure that the issue has been addressed (e.g., to ensure that the suboptimally operating widget is properly functioning).

Figure 5:
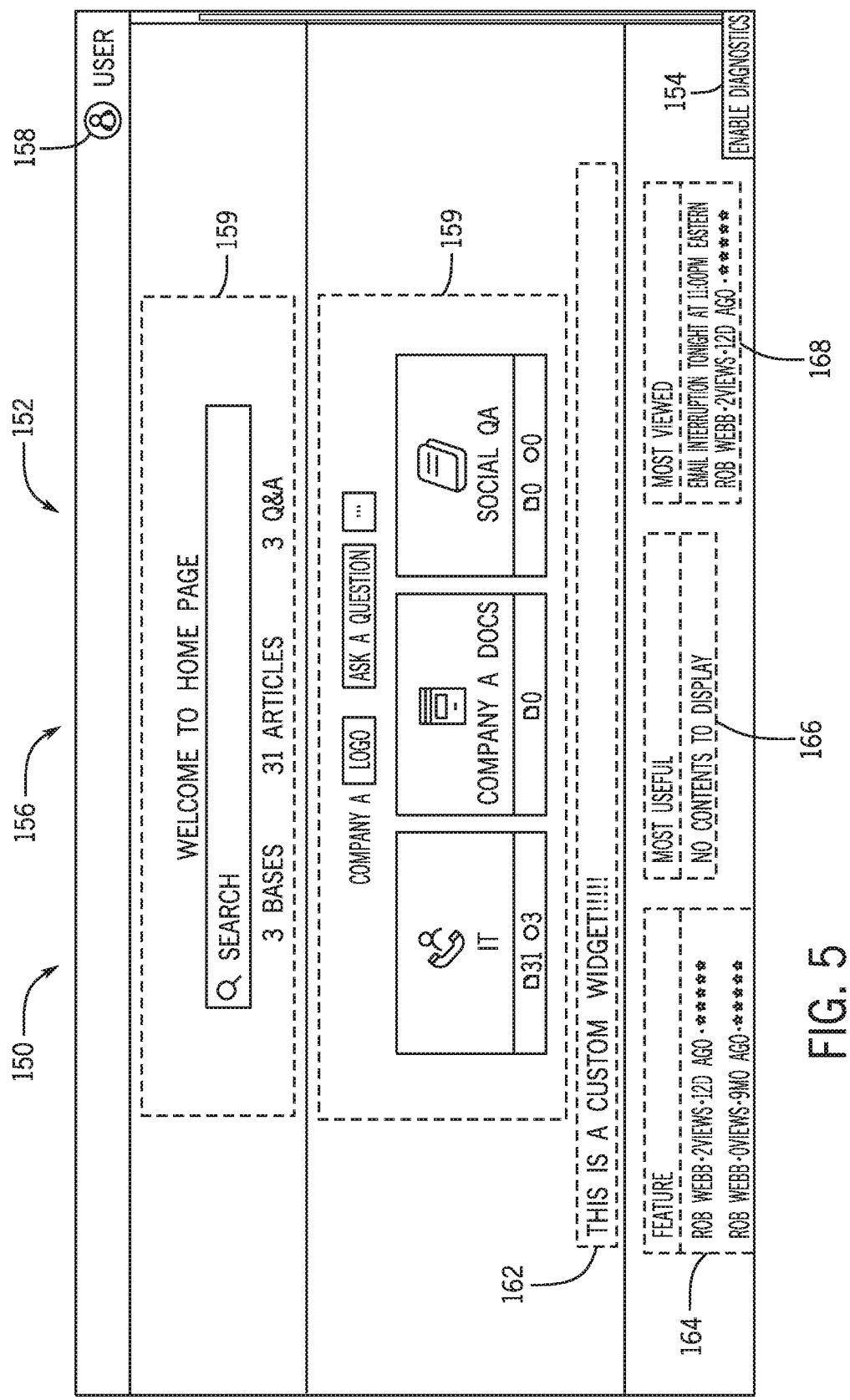
FIG. 5 is a screenshot of an embodiment of a dashboard for enabling access to the service portal diagnosis prompt configured to display the visualization of FIG. 4, in accordance with aspects of the present disclosure.

To further help illustrate the steps in the flow diagram 100 of FIG. 4, FIG. 5 is a screenshot 150 of an embodiment of a dashboard 152 for enabling access to the service portal diagnosis prompt 154 configured to display the visualization of FIG. 4, in accordance with aspects of the present disclosure. In some embodiments, the dashboard 152 may be the home screen that is presented when an application is run. For example, the screenshot 150 may be displayed on a screen associated with the computing system 10 accessible to a service agent in response to running a customized version 156 of the application. Alternatively or additionally, the screenshot 150 may be displayed on a client instance associated to the customized version 156 of the application. The dashboard 152 may present a verification of the identity of the user 158 running the application. The user 158 may be the service agent, the client having access to the client instance, or any suitable personnel associated with the customized version 156 of the application. The customized version 156 of the application may include a plurality of selectable widgets. For example, the customized version 156 may include a home page widget 159, a document management widget 160, a custom widget 162, a featured widget 164, a widget including information identified as useful 166, and a most viewed information widget 168. In some embodiments, the customized version 156 of the application may include the service portal diagnosis prompt 154 that, when selected, may present the service portal diagnosis system that may be utilized to facilitate diagnosis of an issue associated with the customized version 156 of the application.

Figure 6:
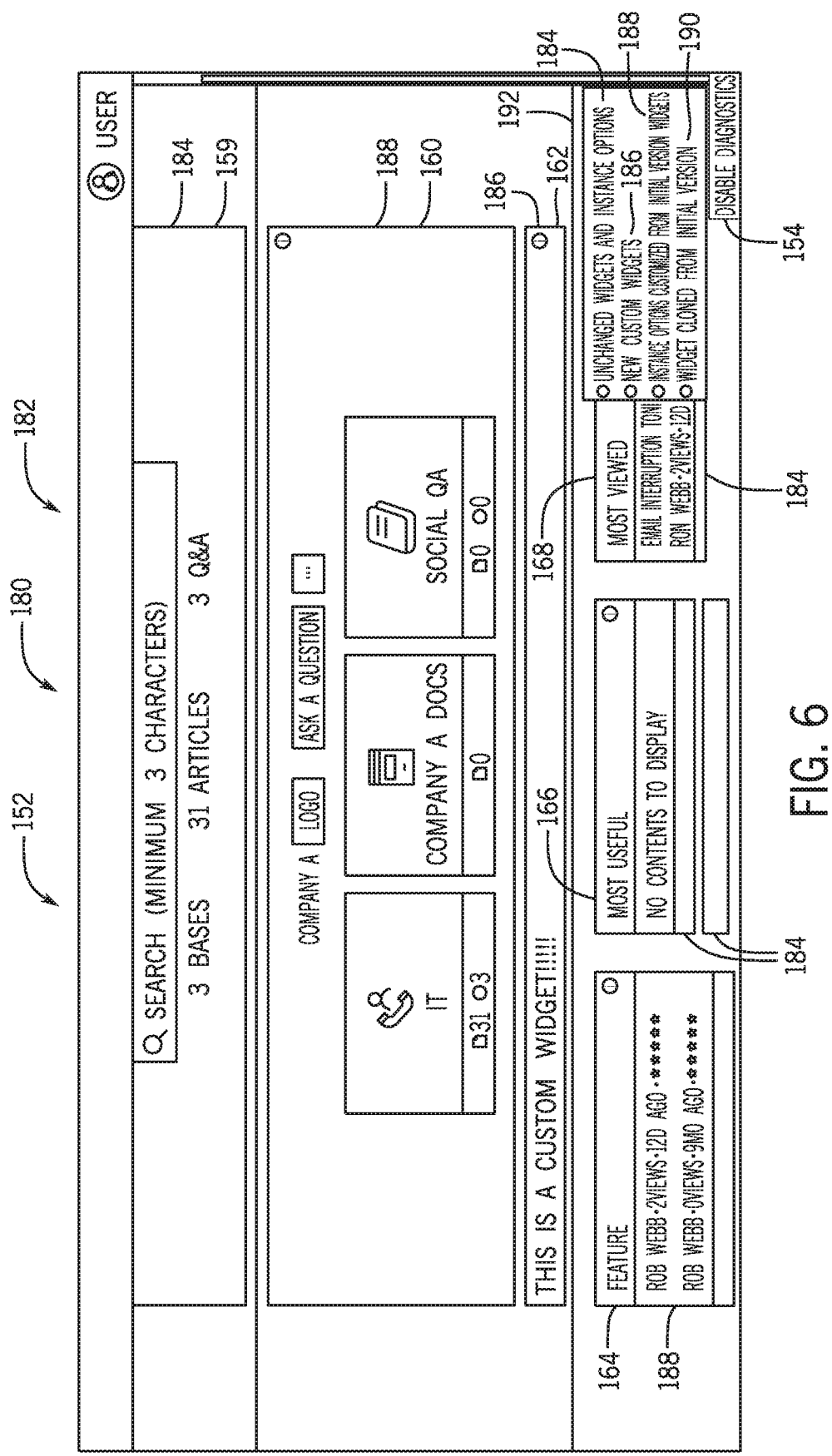
FIG. 6 is a screenshot of an embodiment of the visualization of FIG. 4 generated on the dashboard of FIG. 5, in accordance with aspects of the disclosure.

FIG. 6 is a screenshot 180 of an embodiment of the visualization 182 of FIG. 4 generated on the dashboard 152 of FIG. 5, in accordance with aspects of the present disclosure. The visualization 182 may be generated in response to selection of the service portal diagnosis prompt 154 and may be a feature of the service portal diagnosis system. As described above, the visualization 182 may present various categorizations for each of the widgets. For example, the computing system 10 may categorize the widgets in the customized version 156 into (e.g., labeled as) a first categorization 184 indicative of an unchanged widget as present in the initial version of the application, a second categorization 186 indicative of a new custom widget, a third categorization 188 indicative of a customized widget relative to the initial version of the application, or a fourth categorization 190 indicative of a cloned widget substantially copied from one of one or more widgets of the initial version of the application. The first, second, third, and fourth categorizations may be used to label the widgets running on the customized version 156 of the application (e.g., in response to selection of the service portal diagnosis prompt 154).

In some embodiments, the service portal diagnosis system may include a legend 192 explaining what the first, second, third, and fourth categorizations 184, 186, 188, 190 designate. For example, the first categorization 184 may include a first contour having a first shape (e.g., rectangle, triangle, star, circle, oval, etc.) and a first color (e.g., green) around or associated with the unchanged widget, the second categorization 186 may include a second contour having a second shape (e.g., rectangle, triangle, star, circle, oval, etc.) and a second color (e.g., blue) around or associated with the new custom widget, the third categorization 188 may include a third contour having a third shape (e.g., rectangle, triangle, star, circle, oval, etc.) and a third color (e.g., yellow) around or associated with the customized widget, and the fourth categorization 190 may include a fourth contour having a fourth shape and a fourth color (e.g., blue) around or associated with the cloned widget. The legend 192 may be minimized such that it is hidden from the dashboard 152 and the service portal diagnosis system. While the illustrated embodiment includes four categorizations, it should be understood that any suitable number (e.g., two, three, five, ten, etc.) of categorizations may be included. Additionally, while in the illustrated embodiment the various categorizations are designated with reference numbers (e.g., 184, 186, 188, and 190) to facilitate illustration, it should be understood that the various categorizations may be differentiated with surrounding shapes having lines of various thicknesses, colors, or shapes.

In the illustrated example, the home page widget 159 may be an unchanged widget indicated by the first categorization 184, the document management widget 160 may be a customized widget relative to the initial version of the application indicated by the third categorization 188, the custom widget 162 may be a new custom widget indicated by the second categorization 186, the featured widget 164 may be a customized widget relative to the initial version of the application indicated by the third categorization 188, the widget including information identified as useful 166 may be an unchanged widget indicated by the first categorization 184, and a most viewed information widget 168 may be an unchanged widget indicated by the first categorization 184.

Figure 7:
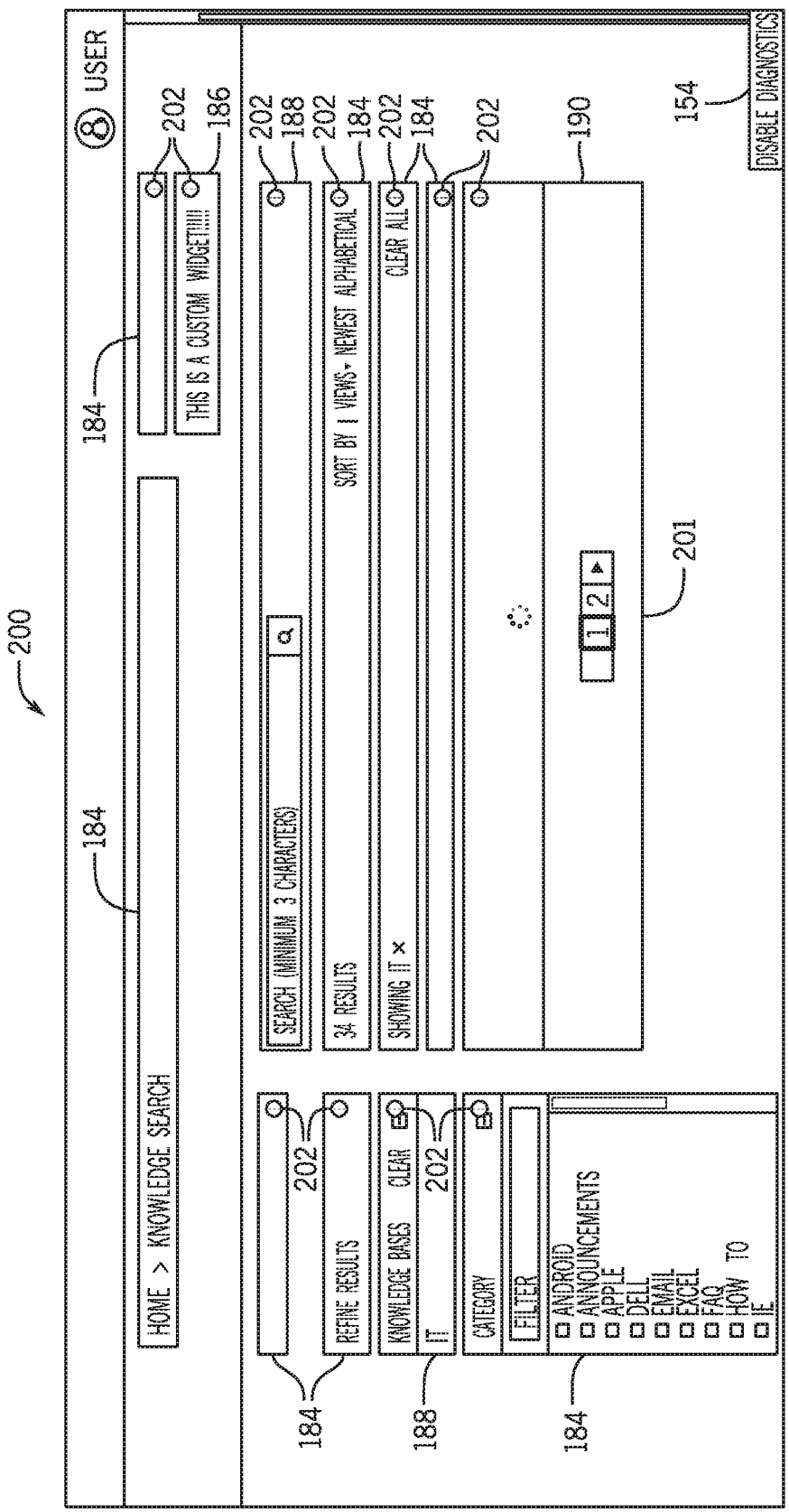
FIG. 7 is another screenshot of the embodiment of the visualization of FIG. 4 generated on the dashboard of FIG. 5, in accordance with aspects of the present disclosure.

FIG. 7 is another screenshot 200 of the embodiment of the visualization 182 of FIG. 4 generated on the dashboard 152 of FIG. 5, in accordance with aspects of the present disclosure. The dashboard 152 may be scrollable, for example, to enable a user (e.g., the service agent) to navigate to view additional widgets that may not all fit on the display. For example, in arriving at the screenshot 200 of FIG. 7 the computing system 10 may receive user inputs indicative of scrolling to navigate down from the screenshot 180 of FIG. 6. In the illustrated embodiment, the dashboard 152 includes the visualization 182 labeling a plurality of widgets with either the first, second, third, or fourth categorizations 184, 186, 188, 190, as described above. In the illustrated embodiment, a communication thread widget 201 may not operate as intended (e.g., as indicated by the loading icon). As such, the communication thread widget 201 may be broken and/or suboptimally operating. The application and all its widgets may have be running properly in the initial version, but after client modification of the application, the communication thread widget 201 may have become faulty. The service portal diagnosis system and its features, such as the visualization 182, may be useful in identifying the issue causing this suboptimal operation by identifying which widgets were customized, cloned, or newly added and which widgets were present in the initial version. In some embodiments, this may be helpful because, if the application and all of its widgets were running properly in the initial version of the application, the cause of the suboptimal operation is likely not due to the unchanged widgets (e.g., designated with the first categorization 184). As such, the widgets of interest may be the client modified widgets, which may be easily identified by employing the service portal diagnosis system disclosed herein.

Figure 8:
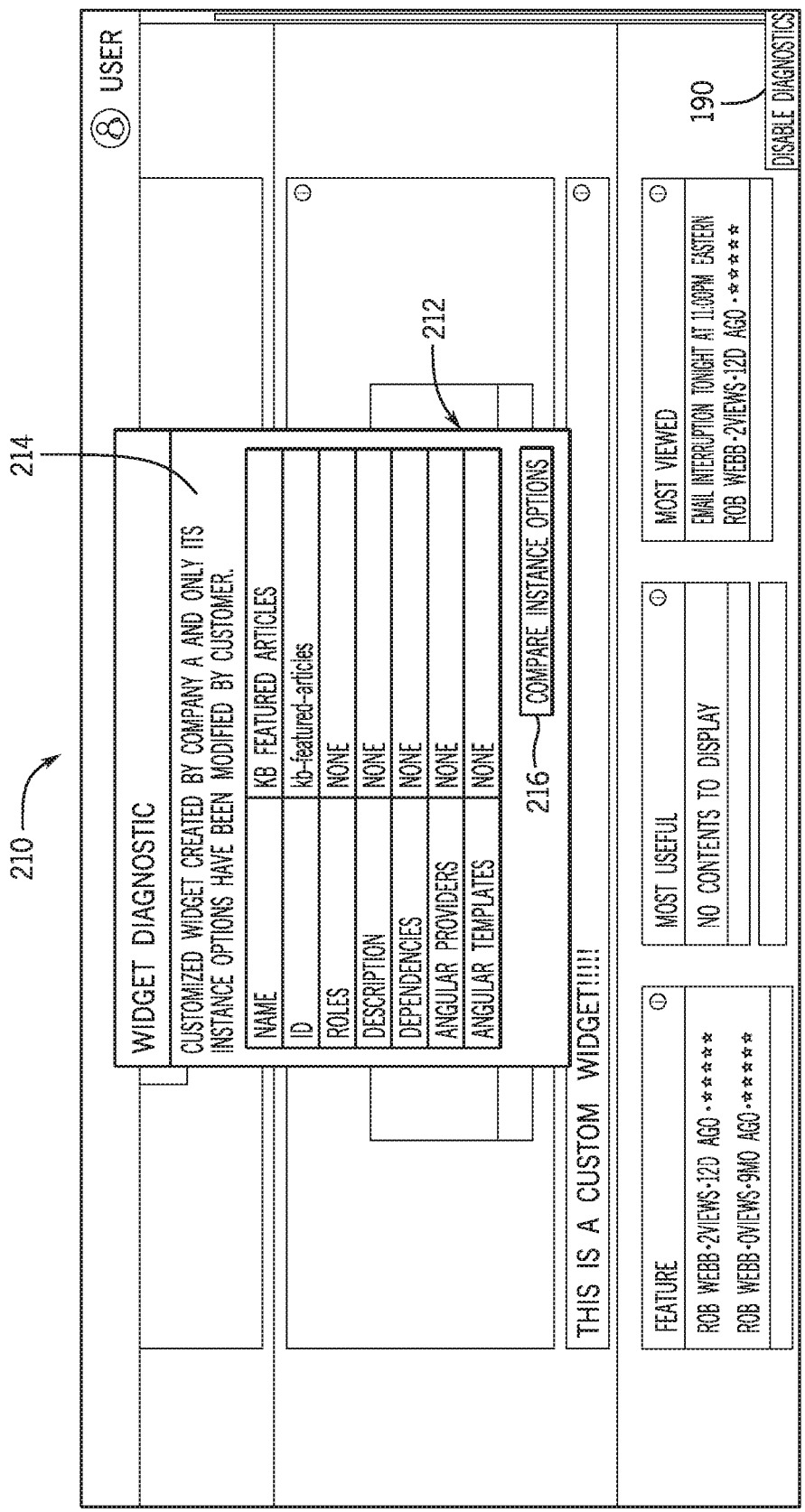
FIG. 8 is a screenshot of an embodiment of a widget diagnosis window including diagnostic information associated with a selected widget of an application, in accordance with aspects of the present disclosure.

In some embodiments, the widgets may include a selectable summary information option 202 that when selected may present a summary of the widget diagnostic data useful in diagnosing the issue. To help illustrate, FIG. 8 is a screenshot 210 of an embodiment of a widget diagnosis window 212 including diagnostic information associated with a selected widget of an application, in accordance with aspects of the present disclosure. The widget diagnosis window 212 may provide a history summary 214, which may include a summary of the selected widget, which in this example, may be a widget in the customized version of the application. Furthermore, in this example, the history summary 214 may include a summary which includes a description such as "CUSTOMIZED WIDGET CREATED BY COMPANY A AND ONLY ITS INSTANCE OPTIONS HAVE BEEN MODIFIED BY CUSTOMER." The history summary 214 may enable a service agent working to diagnose the issue to save time by being presented with information useful in determining whether to further investigate the selected widget, for example, based on the history summary 214.

Additionally, the widget diagnosis window 212 may include any suitable fields useful in determining information associated with the selected widget, such as the name, in this example "Base Featured Articles;" the identification characters (ID), in this example "kb-featured-articles;" and/or any additional information (e.g., role, description, dependencies, angular providers, angular templates, etc.). It should be understood that the fields in the widget diagnosis window 212 may be modified by a service agent, and updated by the computing system 10. The widget diagnosis window 212 may include a selectable compare option 216, that when selected, causes the computing system 10 to generate a comparison of the widget in the initial version to the widget in the customized version 156 of the application.

To that end, FIG. 9 is a screenshot 250 of an embodiment of a version comparison window 252 comparing the widget in the initial version 256 of the application of FIG. 8 and the corresponding widget in the customized version 156 of the application of FIG. 8, in accordance with aspects of the present disclosure. It should be understood that in some embodiments, the customized version 156 of the application may refer to the current (e.g., latest) version of the application, which is being operated by a client (e.g., client instance). In some embodiments, in response to selection of the selectable compare option 216 of the widget diagnosis window 212 of FIG. 8, the computing system 10 may cause presentation of the version comparison window 252 of the service portal diagnosis system. As illustrated, the version comparison window 252 may include a plurality of fields 258 for each of the initial version 256 and the customized version 156 of the selected widget. For example, the version comparison window 252 may include one or more fields 258 including the action, a selectable checkbox indicating whether the corresponding version is active, the bootstrap class name, the bootstrap color, the CSS, the glyph, the ID, the order, the role(s), a short description, the bootstrap size, the column, the widget, the protection policy, the title, the HREF/URL, and any JavaScipt (e.g., JavaScript Object Notation (JSON), etc.) formatted option, to name a few.

In this manner, the version comparison window 252 may serve as a tool helpful in facilitating remedying the issue associated with a suboptimally operating widget of an application. For example, the version comparison window 252 may include the plurality of fields 258 with information corresponding to the widget in the initial version 256 and the widget in the customized version 156 of the application. In some embodiments, presenting information via the version comparison window 252 may be more desirable to a service agent, for example, compared to being present with information (e.g., lines of script) in a scripting interface. A service agent having access to the version comparison window 252 identify the field 258 of interest, and modifying the information for that field corresponding to the selected widget in the customized version 156 to facilitate resolving the issue. In some embodiments, the fields 258 in the version comparison window 252 are customizable, such that, in response to receiving modification (e.g., from service agents), the computing system 10 may propagate the changes to the script corresponding to the modified widget.

The version comparison window 252 may include a save merge option 262, that when selected causes the changes to the fields 258 to be saved. In certain embodiments, selecting the save merge option 262 causes the modifications to the fields to be translated to script modifications that are applied to the script corresponding to the modified widget. Furthermore, the version comparison window 252 may include a revert to selected version option 264, that when selected, causes all the modifications made to the fields 258 to be removed, for example, such that the information in the fields 258 is reverted to the last time the save merge option 262 was selected. Alternatively, selection of the revert to selected version option 264 may cause the information in the fields of the widget corresponding to the customized version of the application to revert to the version of the widget in the initial version of the application.

FIG. 10 is a screenshot 270 of an embodiment of a respective scripting interface 272 for an initial version 256 and a customized version 156 of FIG. 9 of the application of FIG. 8, in accordance with aspects of the present disclosure. In some embodiments, the computing system 10 may generate a scripting interface 272 for each of the version desired to be view. For example, in the illustrated embodiment, a script window 273 includes a first scripting interface 274 including script (e.g., computer code) associated with the widget in the initial version 256 of the application and a second scripting interface 276 including script associated with the widget in the customized version 156 of the application. While two scripting interfaces are included in the scripting window 273, it should be understood that in certain embodiments, the computing system 10 may generate any suitable number of scripting interfaces 272 (e.g., corresponding to various versions of one or more widgets). As mentioned above, presenting information via the version comparison window 252 of FIG. 9 may be more desirable than presenting with information in a scripting interface. However, in some embodiments, the scripting interfaces 272 may be more desirable because service agents may be more comfortable remedying issues arising with faulty script via a scripting interface. Accordingly, the service portal diagnosis system may enable a service agents to diagnose and remedy the issue via a scripting interface, via the version comparison window, and/or any other suitable techniques.

Figure 11:
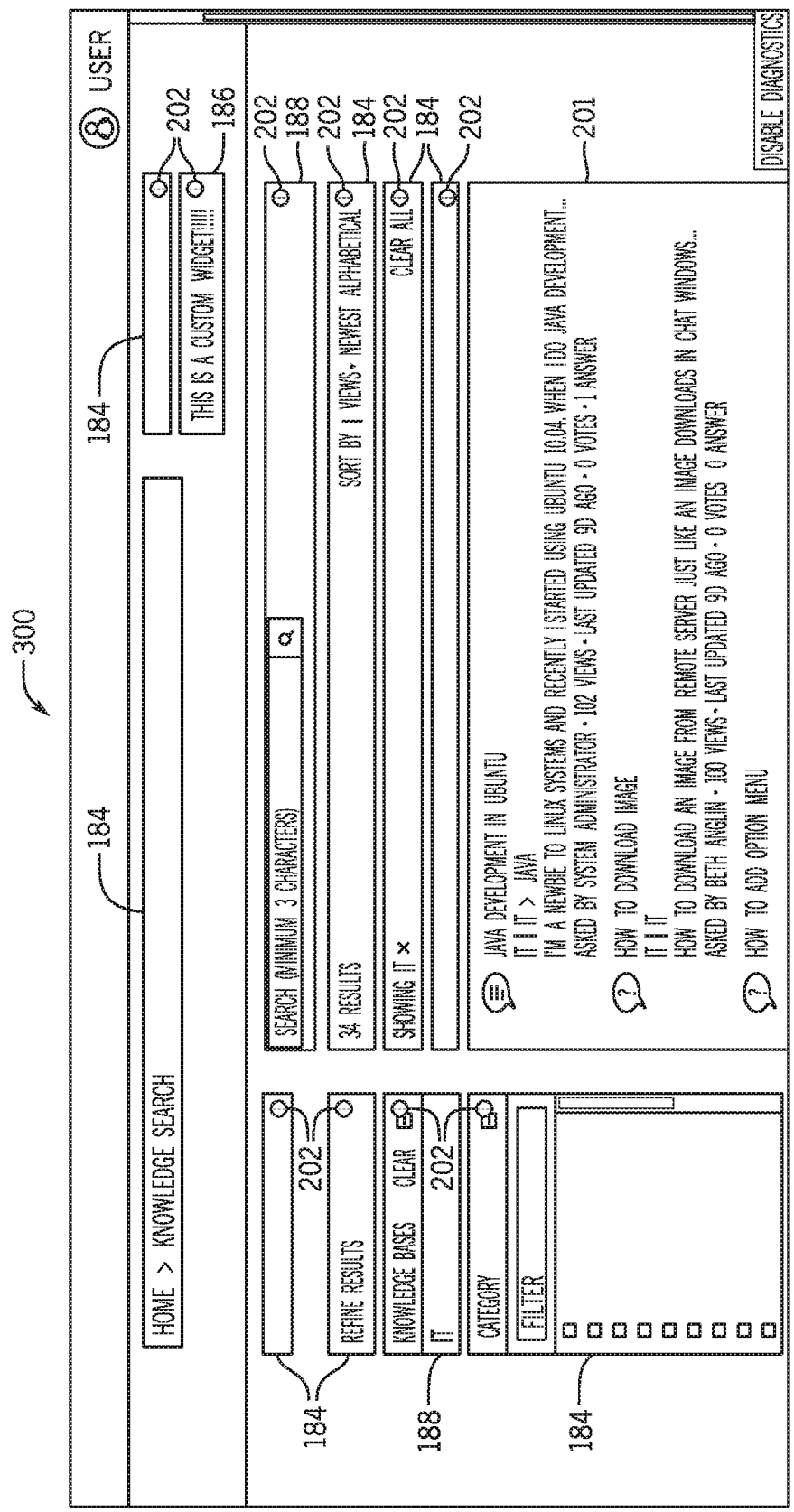
FIG. 11 is a screenshot of an embodiment of the dashboard of FIG. 5, incorporating modifications addressing the issue, in accordance with aspects of the present disclosure.

FIG. 11 is a screenshot 300 of an embodiment of the dashboard 152 of FIG. 5, incorporating modifications addressing the issue, in accordance with aspects of the present disclosure. To continue the example described above, in the screenshot 200 of FIG. 7, the communication thread widget 201 was faulty, and in the screenshot 300 of FIG. 11, the communication thread widget 201 has been fixed, such that the issue causing the optimal operation illustrated in FIG. 7 has been remedied. It should be understood, that the computing system 10 may enable the service agent to transition between the dashboard 152 (e.g., with or without the service portal diagnosis prompt 154 selected/enabled), the history summary 214, the version comparison window 252, the scripting interfaces 272, and/or any other features helpful in diagnosing and remedying the issue. For example, after modifying the script for the faulty widget in the customized version of the application, the service agent may transition to the dashboard 152 to view if the modifications resolved the issue.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system to assist in resolution of one or more performance issues through script comparison or configuration comparison, the system comprising:
a client instance hosted by a one or more data centers, wherein the client instance is configured to run an application accessible on one or more remote client networks, wherein the system is configured to perform operations comprising:
comparing a first set of data indicative of an initial version of the application comprising a base set of widgets, and a second set of data indicative of a customized version of the application comprising a modification to the base set of widgets; and
presenting a visualization associated with one or more widgets of the application based on the comparison, wherein the visualization comprising a representation of a screen of the customized version of the application as seen by a user running the customized version of the application, and wherein the representation comprises the one or more widgets with a respective customization indicative of a pattern or a color indicative of a degree of customization based on the base set of widgets and the modification to the base set of widgets.

2. The system of claim 1, wherein the representation visually categorizes, based on the respective customization, the one or more widgets into a first categorization indicative of an unchanged widget, a second categorization indicative of a new widget not present in the initial version of the application, a third categorization indicative of a customized widget, or a fourth categorization indicative of a cloned widget.

3. The system of claim 2, wherein the first categorization comprises a first contour surrounding the unchanged widget, the first contour having a first color, wherein the second categorization comprises a second contour surrounding the new widget, the second contour having a second color, wherein the third categorization comprises a third contour surrounding the customized widget, the third contour having a third color, and wherein the fourth categorization comprises a fourth contour surrounding the cloned widget, the fourth contour having a fourth color.

4. The system of claim 1, wherein the operations further comprise presenting a first window comprising a first script associated with the initial version of the application and presenting a second window comprising a second script associated with the customized version of the application in response to selection of one of the one or more widgets on the representation.

5. The system of claim 4, wherein the first window displays the first script and the second script side-by-side with respect to one another, wherein the first script and the second script are modifiable.

6. The system of claim 1, wherein the operations further comprise updating the customized version of the application in response to receiving one or more corrective actions to correct the one or more performance issues.

7. The system of claim 1, wherein the one or more performance issues are associated with the modification to the base set of widgets, running the customized version of the application relative to running the initial version of the application, or both.

8. The system of claim 1, wherein the visualization is presented via the client instance.

9. The system of claim 1, wherein comparing the first set of data to the second set of data to facilitates determining the one or more performance issues.

10. A processor-implemented method to assist in resolution of one or more performance issues through script comparison or configuration comparison, the method comprising:

comparing a first set of data indicative of an initial version of an application comprising a base set of widgets to a second set of data indicative of a customized version of the application comprising a modification to the base set of widgets, wherein the application is configured to run on a client instance; and presenting a visualization associated with one or more widgets of the application based on the comparison, wherein the visualization comprises a representation of a screen of the customized version of the application as seen by a user running the customized version of the application, and wherein the representation comprises the one or more widgets with a respective customization indicative of a pattern or a color indicative of a degree of customization based on the base set of widgets and the modification to the base set of widgets.

11. The processor-implemented method of claim 10, further comprising visually categorizing, based on the respective customization, the one or more widgets into a first categorization indicative of an unchanged widget, a second categorization indicative of a new widget not present in the initial version of the application, a third categorization indicative of a customized widget, or a fourth categorization indicative of a cloned widget.

12. The processor-implemented method of claim 11, wherein the first categorization comprises a first contour surrounding the unchanged widget, the first contour having a first color, wherein the second categorization comprises a second contour surrounding the new widget, the second contour having a second color, wherein the third categorization comprises a third contour surrounding the customized widget, the third contour having a third color, and wherein the fourth categorization comprises a fourth contour surrounding the cloned widget, the fourth contour having a fourth color.

13. The processor-implemented method of claim 10, further comprising presenting a first window comprising a first script associated with the initial version of the application and presenting a second window comprising a second script associated with the customized version of the application in response to selection of one of the one or more widgets.

14. The processor-implemented method of claim 10, further comprising updating the customized version of the application in response to receiving one or more corrective actions to correct the one or more performance issues.

15. The processor-implemented method of claim 10, further comprising generating one or more field entries for a plurality of fields corresponding to each of the initial version of the application and the customized version of the application, wherein the one or more field entries comprise information indicative of diagnosis data.

16. The processor-implemented method of claim 10, further comprising generating the client instance based at least on communications between a network of the client instance and one or more remote client networks.

17. A service portal diagnosis interface to assist in resolution of one or more performance issues through script comparison or configuration comparison, wherein the service portal diagnosis interface is generated on a client instance configured to run an application and comprises:

a visualization of diagnosis data associated with one or more widgets of the -a application based on a comparison of:
a first set of data indicative of an initial version of the application comprising a base set of widgets; and
a second set of data indicative of a customized version of the application comprising a modification to the base set of widgets,
wherein the visualization comprises a representation of a screen of the customized version of the application as seen by a user running the customized version of the application, and wherein the representation comprises the one or more widgets with a respective customization indicative of a pattern or a color indicative of a degree of customization based on the base set of widgets and the modification to the base set of widgets.

18. The service portal diagnosis interface of claim 17, wherein the visualization visually categorizes the one or more widgets into a first categorization indicative of an unchanged widget, a second categorization indicative of a new widget not present in the initial version of the application, a third categorization indicative of a customized widget, or a fourth categorization indicative of a cloned widget.

19. The service portal diagnosis interface of claim 18, wherein the first categorization comprises a first contour surrounding the unchanged widget, the second categorization comprises a second contour surrounding the new widget, the third categorization comprises a third contour surrounding the customized widget, and the fourth categorization comprises a fourth contour surrounding the cloned widget.

20. The service portal diagnosis interface of claim 17, wherein the one or more performance issues are identified based on the comparison of the first set of data to the second set of data.

* * * * *